United States Patent
Krämer et al.

(10) Patent No.: US 6,839,789 B2
(45) Date of Patent: Jan. 4, 2005

(54) BUS REPEATER FOR COUPLING A FIRST AND SECOND BUS

(75) Inventors: Joachim Krämer, Köngen (DE); Alexander Aichele, Ostfildern (DE)

(73) Assignee: Festo AG & Co., Esslingen (DE)

( * ) Notice: Subject to any disclaimer, the term of this patent is extended or adjusted under 35 U.S.C. 154(b) by 464 days.

(21) Appl. No.: 09/977,466

(22) Filed: Oct. 15, 2001

(65) Prior Publication Data

US 2003/0074511 A1 Apr. 17, 2003

(30) Foreign Application Priority Data

Oct. 18, 2000 (DE) .......................................... 100 51 591

(51) Int. Cl.[7] .......................... G06F 13/40; G06F 15/173
(52) U.S. Cl. .......................... 710/305; 710/31; 370/492; 375/211
(58) Field of Search .......................... 710/305, 31, 306, 710/313, 314, 105, 200; 370/351, 287, 492, 501; 709/239, 253; 375/211; 326/104; 340/825.5

(56) References Cited

U.S. PATENT DOCUMENTS

| | | | |
|---|---|---|---|
| 3,673,326 A | * | 6/1972 | Lee ............................ 178/71.1 |
| 4,974,153 A | * | 11/1990 | Pimm et al. ................. 710/306 |
| 5,809,077 A | | 9/1998 | Dorner et al. |
| 6,493,785 B1 | * | 12/2002 | Galloway .................... 710/314 |
| 6,557,064 B1 | * | 4/2003 | Galloway .................... 710/260 |
| 6,581,126 B1 | * | 6/2003 | Regula ........................ 710/305 |
| 2001/0004751 A1 | | 6/2001 | Necker et al. |

OTHER PUBLICATIONS

"Scalable coherent interface" by Gustavson, D.B. (abstract only).*
"IEEE P1596, a scalable coherent interface for gigabyte/sec multiprocessor applications" by Gustavson, D.B. (abstract only).*

* cited by examiner

Primary Examiner—Gopal C. Ray
(74) Attorney, Agent, or Firm—Hoffmann & Baron, LLP

(57) ABSTRACT

A bus-repeater for coupling at least one first bus with a second bus, by way of which data may be transmitted in the form of serial digital signal pulse sequences and including at least one first and a second transmit-receive device, with which the first and, respectively, the second bus may be coupled and by way of which the bus-repeater may transmit signal pulse sequences, received via the first bus on the second bus, and vice versa. In accordance with the invention the bus-repeater includes locking device, which during transmission of a signal pulse received from the first bus to the second bus lock transmission by the bus-repeater of signal pulses, received from the second bus, via the first bus for a transmission locking time and vice versa.

15 Claims, 3 Drawing Sheets

BUS REPEATER FOR COUPLING A FIRST AND SECOND BUS

BACKGROUND OF THE INVENTION.

The invention relates to a bus-repeater for coupling at least one first bus to a second bus, by way of which data are transmitted as serial digital signal pulse sequences, comprising at least one first and a second transmit-receive means, to which the first and, respectively, the second bus may be coupled and by way of which the bus-repeater may transmit signal pulse sequences received from the first bus via the second bus and vice versa.

Such a bus, along which data are transmitted as serial, digital signal pulse sequences, is for instance a CAN bus (CAN standing for Controller Area Network). Along such transmission lines termed "CAN high" and "CAN low" transmissions lines one respective participant may transmit digital signal pulse sequences, which are then received by all participants including the transmitting participant. In the case of the CAN protocol a distinction is drawn as regards a signal pulse between two logical states: the bits are either "recessive" (logical 1) or "dominant) (logical 0). If a dominant signal is transmitted from at least one bus participant, then recessive signals, which other participants transmit, are overwritten.

Typically a bus possesses a line topology, in which diverse participants are connected at bus lines terminated by terminal resistors. For many applications it is however advantageous to develop linked systems, in which buses are linked with one another. In the simplest case only two buses are joined together. In more complicated applications the bus arrangement will have a tree-like topology, in which for example two further buses branch off from a first bus.

In each case for coupling two buses a so-called bus-repeater will be necessary, which transmits signal pulse sequences received from one bus to the other bus and vice versa. In the case of known bus-repeaters a microcontroller receives the signal pulse sequences received from one bus by way of a bus interface and transmits same then by way of a further bus interface to the second bus and vice versa. Conventionally, in this case, the signal pulse sequences of entire messages are completely received by the microcontroller before they are passed on to the second bus. This leads to undesired delays during signal transmission between the respectively linked buses. Furthermore, known bus-repeaters are expensive owing to the necessary microcontrollers.

SHORT SUMMARY OF THE INVENTION

One object of the invention is to devise an economic, high speed bus-repeater.

In order to achieve these and/or other objects appearing from the present specification, claims and drawings, in the present invention a bus-repeater is provided which comprises locking means, which during the transmission of a signal pulse received by the first bus via the second bus lock transmission by the bus-repeater of signal pulses, received from the second bus, via the first bus for a lock time and vice versa.

The basic teaching of the invention is accordingly not firstly to await the input of a signal pulse sequence constituting a message, but rather to transmit the respective signal pulse sequence directly after the reception thereof without delay, from the one bus to the respectively other bus. In the case of the CAN bus, which represents a preferred field of application for the invention, in this case a recessive-dominant-recessive change in state is transmitted by the bus-repeater from one bus to the other bus. Since however the bus-repeater again receives, and as it were tunes in on, the signal pulses transmitted by it to the second bus, it would transmit the same back to the first bus. The result would therefore be a sort of circular traffic. Therefore locking means are included in the bus-repeater in accordance with the invention, which during the transmission of a signal pulse received from the first bus via the second bus lock or prevent transmission of signal pulses received from the second bus by the repeater via the first bus and vice versa. In the case of the CAN bus the locking means are active during transmission of a dominant signal pulse received from the first bus to the second bus and vice versa.

The bus-repeater is compact in design and may be manufactured using low priced components so that for instance it can be integrated in one connecting plug for the connection of two or more buses. The bus-repeater may be manufactured using separate components or, in an advantageous form thereof, in the form of an integrated circuit, it then not requiring any expensive components, as for example a microcontroller. Furthermore, no Baud rate setting of the bus-repeater is necessary, since such rate is more or less automatically adapted to the respective Baud rates.

Further advantageous developments of the invention are defined in the claims.

Under ideal conditions a signal pulse will have vertically rising and falling edges. However, in practice, owing to the conduction capacity of the bus-repeater lines, there is frequently the problem that the trailing edge at the end of a signal pulse transmitted on one bus—in the case of the CAN bus this will be the signal edge on transition from the dominant to the recessive state—falls in the form of an exponential function for example. The participant connected with the respective bus, that is to say the bus-repeater as well, will only recognize such a slowly falling signal pulse, when same goes below a predetermined voltage threshold. Consequently, the bus-repeater will transmit a signal pulse, for example one received by the first bus, for a correct first signal pulse duration to the second bus, but will however receive this signal pulse for a second signal pulse duration extended by the signal decay to be longer than the first signal pulse duration, from the second bus. In order to ensure that the bus-repeater does not, owing to the decay time, again detect the presence of a signal pulse to be transmitted, on the second bus, and then transmit same back to the first bus, in accordance with an advantageous form of the invention the locking means are so designed that same prolong the transmit locking time for a predetermined overrun time. Accordingly, it is possible for a signal pulse present on the second bus owing for a prolonged time to decay without the bus-repeater returning this signal pulse back to the first bus in an improper manner.

Owing to the above explained decay of signal pulses and therefore their prolongation wait times, during which times the bus-repeater is unable to transmit a renewed signal pulse. In the case of high Baud rates and in extreme cases wait times may occur, which are approximately 50% of the intended duration of the respective pulse. Therefore the bus-repeater will preferably comprise unloading means for unloading the first bus and/or the second bus after completion of transmission of a signal pulse to the first bus or, respectively, the second bus so that the decay time of the signal pulses is shortened and signal pulse transmission may be resumed. In the case of the CAN bus a state change from dominant to recessive is accordingly accelerated.

In accordance with a preferred design of the invention the unloading means comprise a time controlled short circuit switch, as for instance a transistor.

It is also possible for the unloading means to find a voltage level, which is still present following the transmission of a signal pulse by the bus-repeater to the respective bus and deactivate the unloading means again when a predetermined limit value is gone below.

The unloading means may be activated for the entire overrun time of the locking means or however only during a part of the overrun time.

More particularly when the unloading means are activated during the entire overrun time of the locking means it is an advantage to provide a common timer for the unloading means and the locking means for the formation of an overrun time pulse.

The bus-repeater is, it is true, a preferred design provided for the operation of CAN buses. However in principle other buses, which possess a similar operational principle to that of CAN buses, may as well be operated with a bus-repeater designed in accordance with the invention.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES.

Figure 3A:
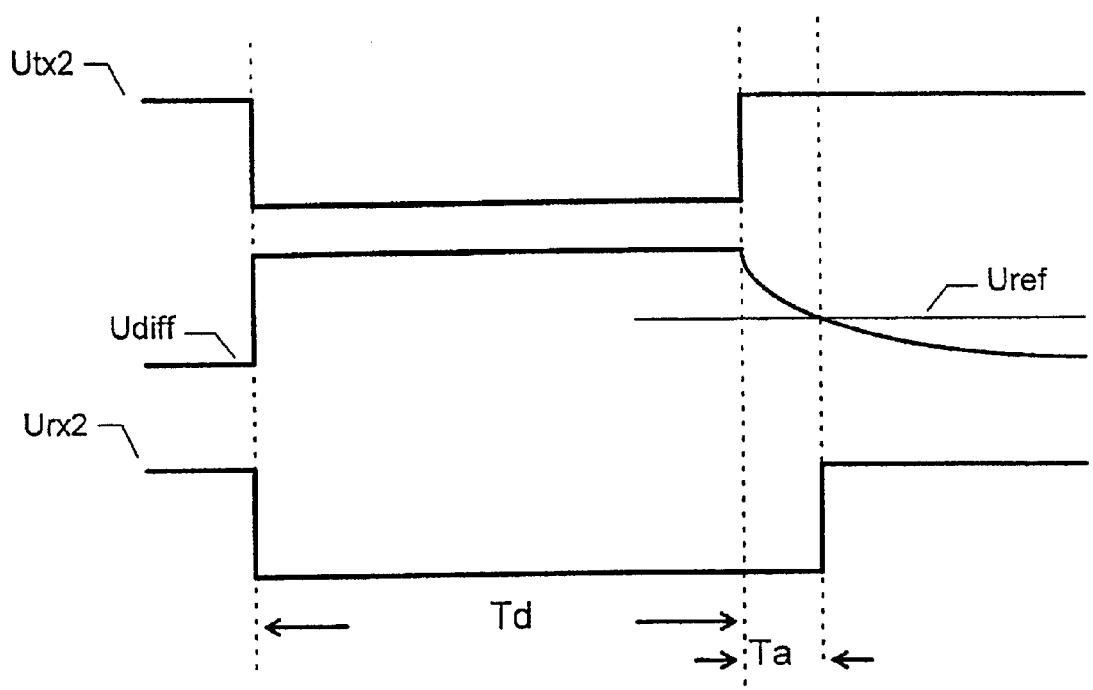

FIG. 3*a* shows the principle of signal changes with time absent the action of unloading means.

Figure 3B:
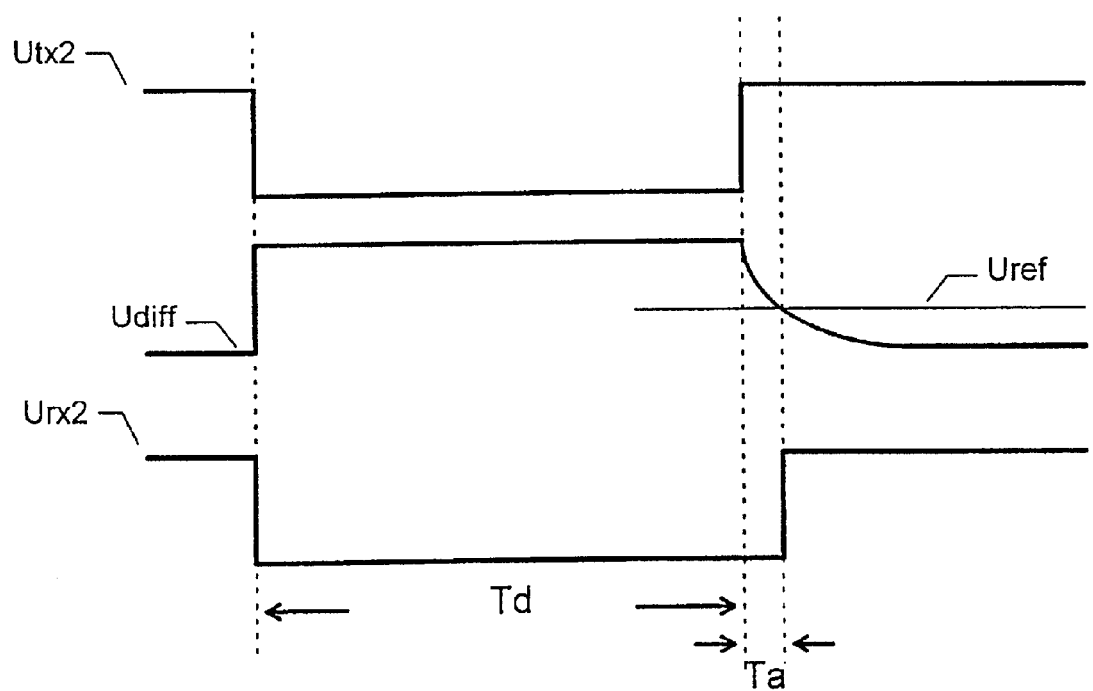

FIG. 3*b* shows the principle of signal changes with time under the influence of unloading means in accordance with the invention.

DETAILED ACCOUNT OF WORKING EMBODIMENT OF THE INVENTION.

Figure 1:
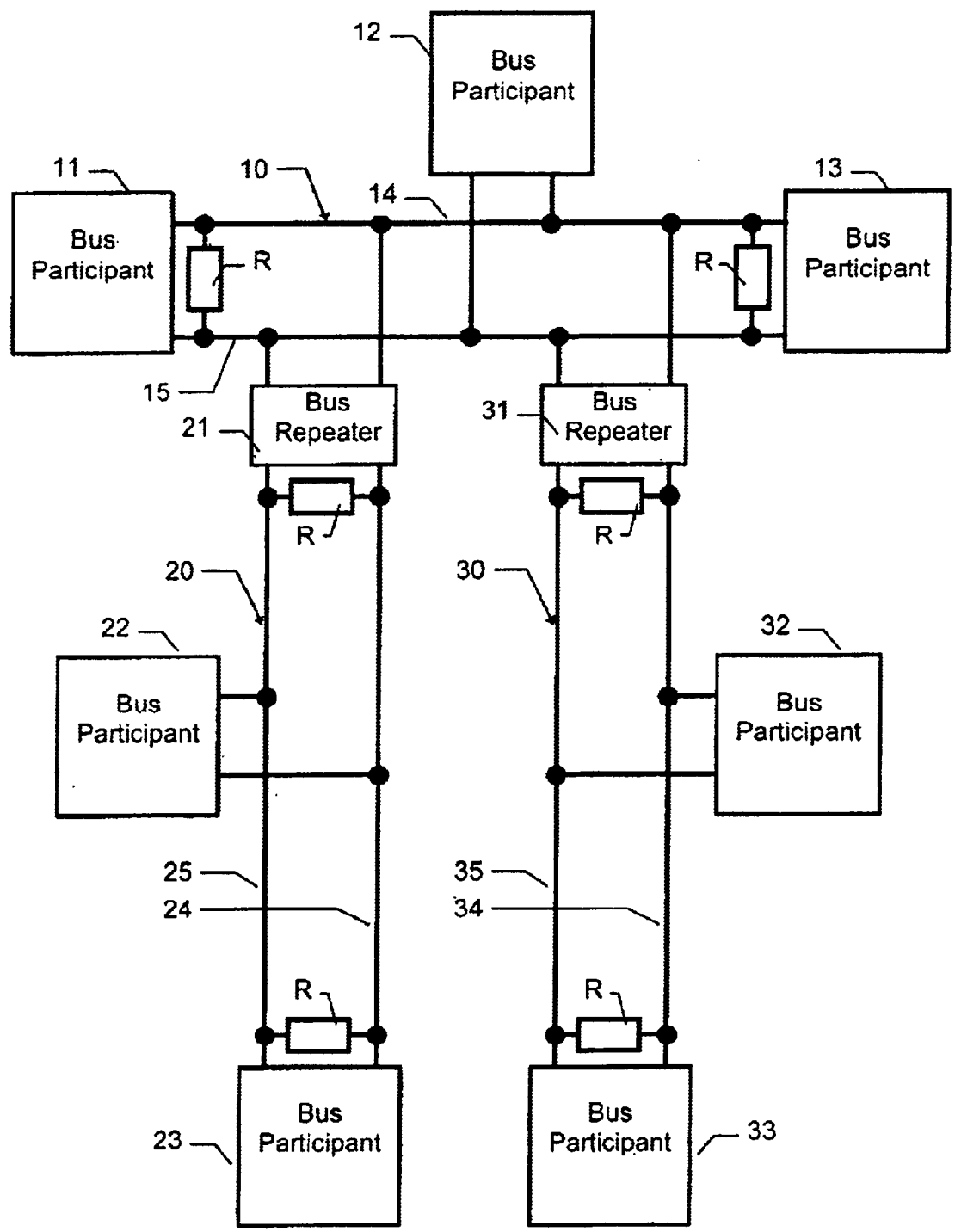
FIG. 1 shows one arrangement having a tree-like CAN bus arrangement, whose buses are connected with each other by a bus-repeater designed in accordance with the invention.

FIG. 1 depicts a bus 10, which in the present case is a CAN bus, with connected bus traffic participants 11, 12 and 13. In the case of such bus participants 11, 12 and 13 it is a question for example of control device for fluid power valve arrangements, which communicate with one another by way of the bus 10. Moreover, CAN buses 20 and 30 are connected to the bus 10 by way of bus-repeaters 21 and, respectively, 31, which in the present case are of identical design. The bus 20 serves as a communication medium for the bus participants 22 and 23, whereas the bus 30 serves the bus participants 32 and 33. The bus participants 22 and 23 and furthermore 32 and 33 are for example local control means, which are associated with the bus participants 11 and respectively, 13. The buses 10, 20 and 30 possess bus lines 14, 15, 24 and 25 and, respectively, 34 and 35, which are each terminated by terminal resistors R at the bus end. The bus line 14 serves as a CANH lines ("CAN high") and the bus line 15 as a CANL line ("CAN low"). The same applies for the bus line 24 and, respectively, 34 and 35. The CANH bus lines 24 and 34 are suitably connected by way of the bus-repeaters 20 and, respectively, 30 with the CANH bus line 14, the CANL bus lines 25 and 35 suitably connected with the CANL bus line 15. During the transmission of a dominant signal pulse (logical "0") there is a voltage differential of for example 5V between the CANH and CANL bus lines, whereas in the recessive state (logical "1") the voltage differential is less than for instance 0.5V.

Figure 2:
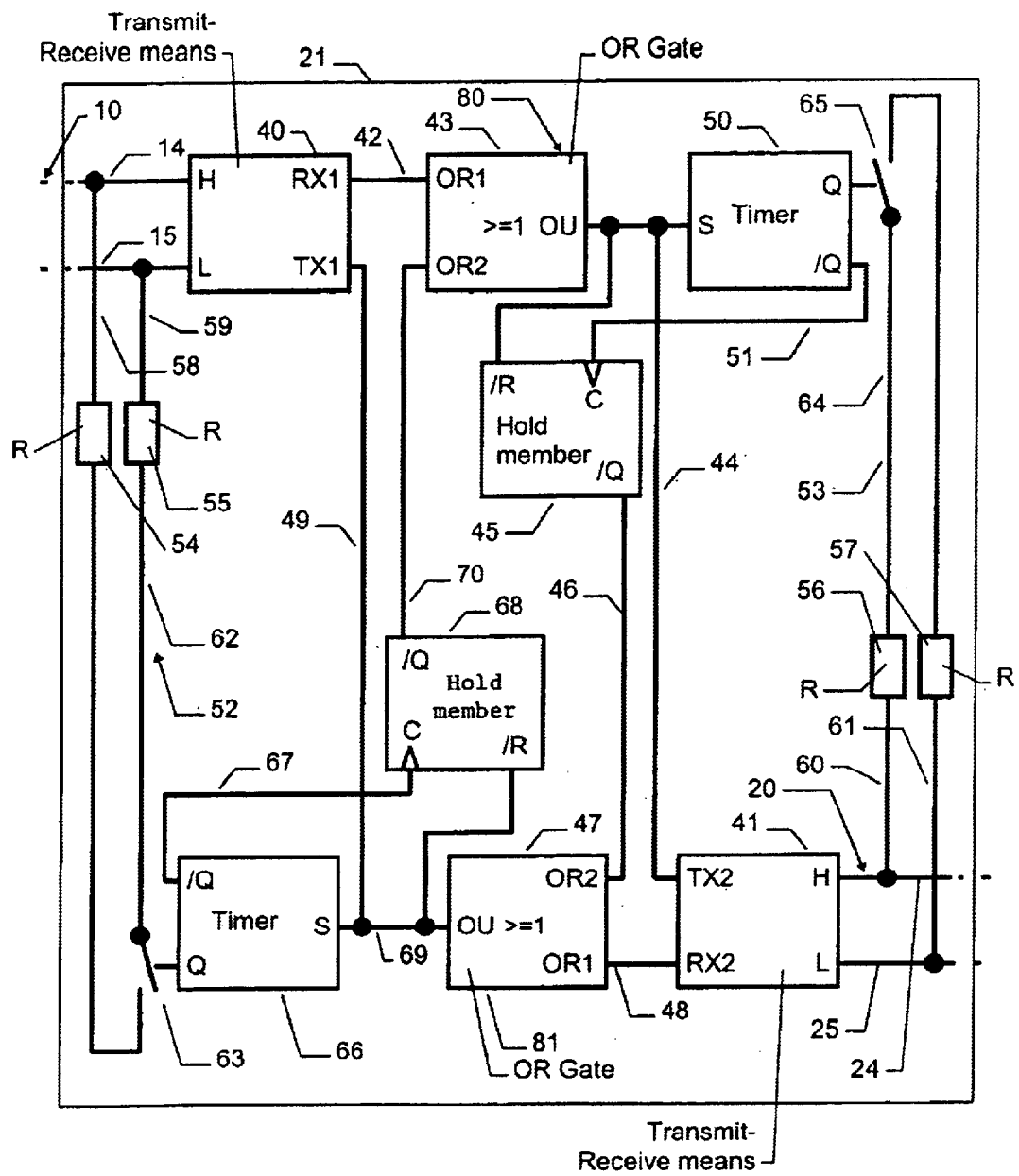
FIG. 2 shows a block circuit diagram of a bus-repeater in accordance with FIG. 1.

FIG. 2 shows a circuit diagram of the bus-repeater 21. The terminals H and L of a transmit-receive means 40 are connected with the bus lines 14 and, respectively, 15. The transmit-receive means 40 is for example a so-called transceiver or CAN controller interface component, as for example a Philips PCA82C250 or an Infineon TLE6252G. The transmit-receive means 40 transmits serial digital signal pulse sequences on the bus 10, such sequences being set an input TX1. Signal pulse sequences received by the bus 10 are sent by the transmit-receive means 40 to an output RX1. In the case of a dominant signal on the bus 10 there will be a logical level of "0" on the bus 10 at the output RX1, whereas in the case of a recessive signal the transmit-receive means 40 will have an output in the form of a logical level of "1". A transmit-receive means 41 corresponding to the transmit-receive means 40 serves as an interface component to the bus 20.

By way of a switching mimicry means, which will be explained in the following, comprising locking means 80 and 81 the output RX1 of the transmit-receive means 40 is connected indirectly with the input TX2 of the transmit-receive means 41 and its input RX2 is connected with the input TX1 of the transmit-receive means 40 so that the bus-repeater 21 transmits the signal pulse sequences, received from the bus 10, to the bus 20 and vice versa. The locking means 80 lock a transmission of a dominant signal pulse from the bus 10 to the bus 20 whereas the locking means 81 lock transmission in the opposite direction.

The output RX1 of the transmit-receive means 40 leads by way of a connection 42 to the input OR1 of an OR gate 43 associated with the locking means 80. The output thereof OU is connected by way of a line 44 with the input TX2 of the transmit-receive means 41. The OR gate 43 locks 43 the transmission of a dominant signal (logical "0") from the output RX1 of the transmit-receive means 40 to the input TX2 of the transmit-receive means 41 to the extent that there is a logical level of "1" at its input OR2, which is controlled on the basis of the output RX2 of the transmit-receive means 41.

In the following further details of the circuit illustrated in FIG. 2 and the function thereof will be described on the basis of a transmission of a dominant signal pulse from the bus 10 to the bus 20, an inactive state being initially assumed, wherein there has been no transmission of data immediately preceding to the transmission of the signal pulse and wherein there is therefore the logical level of 1 at the outputs RX1 and RX2.

Upon the arrival of the dominant signal pulse from the bus 10 the output RX1 of the transmit-receive means 40 issues a level change from logical 1 to logical 0, this leading to an output signal of 0 at the output OU of the OR gate 43, since, owing to the inactive state preceding the transmission of the signal pulse, its input OR2 will also be at 0. Owing to the level change at the output OU of the OR gate 43 the input TX2 of the transmit-receive means 41 will be set at 0 so that such means will transmit a dominant signal, that is to say a voltage differential, to the bus 20. Moreover, the output OU sets an inverting reset input/R, connected with the line 44, of a hold member 45, associated with the locking means 81, such hold member 45 being for instance a JK flip-flop (e.g. 74HC74). Its inverting output/Q will then be at the level 1, which is supplied by way of a line 46 to the one input OR2 of an OR gate 47, which is associated with the locking means 81 for the transmission path from the bus 20 to the bus 10, so that the OR gate will transmit a level of 1 at is output OU, irrespectively of the instantaneous level of 0 or 1 at its input OR1. Even when the output RX2 of the transmit-receive means 41 applies the 0 level, i. e. a dominant state by way of a line 48, to the input OR1 of the OR gate 47, there will be the 1 level at its output OU, that is to say a recessive state, which is supplied by way of a line 48 to the input TX1 of the transmit-receive means 40.

Although the transmit-receive means 41 receives the dominant signal its has just transmitted and passes on same as a 0 level to its output RX2, which without the locking means 81 would lead to the transmission of a dominant signal to the bus 10, the retransmission of the dominant level 0 to the transmit-receive means 40 is prevented by the OR gate 47 for a lock time, which runs at least during the transmission procedure for the signal pulse from the bus 10 to the bus 20.

It will be clear that for such locking function other electrical components could be employed, as for instance instead of the hold member 45 an inverting member could be utilized. Furthermore, the logic could be different.

At the end of the dominant signal pulse from the bus 10 the output RX1 of the transmit-receive means 40 provides a level change from logical 0 to logical 1, which leads to an output signal 1 at the output OU of the OR gate 43. Owing to this rising signal edge the transmit-receive means 41 terminates its transmission operation and a timer 50 is started which is associated with the locking means 81 and whose input S is connected by way of line 44 with the output OU of the OR gate 43. Moreover, the rising signal edge and therefore a level 1 is sent to the input/R of the hold member 45 by the output OU. This means that its reset state is again overridden and clocked operation is again possible by way of its clock input C.

However firstly the hold member 45 issues a further level 1 at its output/Q so that the OR gate 47 will continue locking the transmission of dominant signals from the bus 20 to the bus 10. The timer 50 will continue to transmit, by way of its one output/Q, which is connected via a line 51 with the clock input C of the hold member 45, a level 0 so that the hold member 45 continues to issue a level 1 at its output/Q and the OR gate 47 will continue to lock the transmission of a dominant level 0 from the transmit-receive means 41 to the transmit-receive means 40 for a predetermined overrun time prolonging the transmission lock time.

The overrun time is able to be set at the timer 50, for instance in accordance with the time characteristic of the respective bus. Such a characteristic is to be explained with reference to FIG. 3a. Here the change with time of a signal Utx2 is illustrated, which indicates a signal pulse with a recessive to dominant to recessive level change at the input Tx2 of the transmit-receive means 41. The duration of the signal pulse is termed Td. The transmit-receive means 41 transmits this signal pulse as a voltage differential Udiff to the bus 20. The rising signal edge of the voltage differential Udiff firstly rises in an ideal manner steeply and the reaches the dominant level, for instance in the case of the above mentioned PCA82C250 after only approximately 50 nanoseconds. The voltage differential Udiff is received again by the transmit-receive means 41 and made available at the output RX2 as the changing signal Urx2. The dominant state of the signal Urx2 is here reached rapidly, for instance after approximately 300 nanoseconds in the case of the PCA82C250. In FIG. 3a however the above mentioned short delays in the nanosecond range are omitted for simplification.

After the elapse of the signal duration Td the input level Utx2 will rise to the recessive state (level 1) and the transmit-receive means 41 will in the ideal case, transmit a vertically falling voltage differential Udiff to the bus 20. However, the same has line capacities so that the voltage differential Udiff will not drop as an ideal vertical edge, but in the form of an exponential function owing to such line capacities. It is only when the voltage differential Udiff gets below a reference voltage value Uref after a decay time Ta that the transmit-receive means 41 will see that a dominant to recessive signal change has takes place. Accordingly the transmit-receive means 41 will not issue a signal pulse with a duration of Td but a signal pulse prolonged by the decay time Ta and having the duration Td+Ta. The overrun time to be set at the timer 50 is accordingly to be set to be at least as long as the duration of decay.

In order to shorten the decay time Ta unloading means 52 and 53 are provided on the bus-repeater 21 so that the signal changes, represented in FIG. 3b diagrammatically, occur. By means of the unloading means 52 and 53 the buses 10 and, respectively, 20 are actively unloaded following a signal pulse, such signal pulse having been transmitted by the transmit-receive means 40 and, respectively, 41.

The unloading means 52 and 53 comprise unload resistors 54 and 55 and, respectively, 56 and 57, which are connected by way of lines 58 and 59 and, respectively, 60 and 61 with the bus lines 14 and 15 and respectively 24 and 25. A line 62 runs from the resistor 54 by way of a short circuit switch 63 to the resistor 55, and from the resistor 56 a line 64 runs by way of a short circuit switch 65 to the resistor 57. The short circuit switches 63 and 65 are for example transistors. The short circuit switch 65 is connected with the output Q of the timer 50 and by the timer is operated during the overrun time prolonging the locking time from the bus 20 to the bus 10 so that it acts as a time controlled or clocked short circuit switch. After this the short circuit switch 65 is operated as long as the OR gate 47, serving as a locking means, remains in the locking setting under the control of the hold means 45.

The effect of the unloading means 53, namely the shortening of the decay time Ta, is diagrammatically depicted in FIG. 3b. Owing to the shortening of the decay time Ta the locking time is also shortened for the following transmission of a signal pulse from the bus 20 to the bus 10.

In principle the short circuit switch 65 could be merely operated during a part of the said overrun time or be switched off on reaching a switching threshold, for example on reaching the voltage Uref indicated in the FIGS. 3a and 3b. Furthermore, for the setting of the overrun time and for the activating of the unloading means separate timers could be provided.

The means provided in the bus-repeater 21 for reliable transmission of a signal pulse from the bus 20 to the bus 10 are in structure and function essentially in accordance with those already described with reference to the transmission of a signal pulse from the bus to the bus 20 so that a detailed account is unnecessary. The locking means 80 are provided with a timer 66, which in function corresponds to the timer 50 and is therefore connected on the input side via a line 69 with the output OU of the OR gate 47 and on the output side operates on the one hand the short circuit switch 63 and on the other hand, by way of a line 67, controls a clock input C of a hold member 68 associated with the locking means 80. The reset input/R thereof is connected by way of the line 69 with the output OU of the OR gate 47 and its output/Q is connected by way of a line 70 with the output OR2 of the OR gate.

Accordingly the bus-repeater 21 does have means, which mutually lock and then unlock its transmission paths from the bus 10 to the bus 20 and vice versa during the transmission of a signal pulse.

What is claimed is:

1. A bus-repeater for coupling at least one first bus to a second bus, by way of which data are transmitted as serial digital signal pulse sequences, comprising at least one first and a second transmit-receive means, to which the first and, respectively, the second bus are coupled and by way of which the bus-repeater transmits signal pulse sequences received from the first bus to the second bus and vice versa, and locking means, which during the transmission of a signal pulse received by the first bus via the second bus lock transmission by the bus-repeater of signal pulses, received from the second bus, via the first bus for a lock time and vice versa.

2. The bus-repeater as set forth in claim 1, wherein the locking means are so designed that same prolong the locking time for a predetermined overrun time.

3. The bus-repeater as set forth in claim 1, comprising unloading means for unloading the first and/or the second bus after performance of transmission of a signal pulse to the first bus or, respectively, the second bus.

4. The bus-repeater as set forth in claim 3, wherein the unloading means include a clocked short circuit switch.

5. The bus-repeater as set forth in claim 3, wherein the unloading means are adapted to be controlled by a voltage level, which is still present after the transmission of a signal pulse by the bus-repeater to the respective first or second bus.

6. The bus-repeater as set forth in claim 3, wherein the unloading means are activated at least during a part of an overrun time and preferably during the entire overrun time.

7. The bus-repeater as set forth in claim 6, comprises a common timer for activating the unloading means and for the formation of an overrun pulse for the locking means.

8. The bus-repeater as set forth in claim 1 adapted to transmit signal pulses received by the first bus without intermediate storage in the second bus and vice versa.

9. The bus-repeater as set forth in claim 1 adapted to re-receive signal pulses, respectively transmitted by it, in the first and the second bus.

10. The bus-repeater as set forth in claim 1, wherein the first and the second buses are CAN buses.

11. The bus-repeater as set forth in claim 10, wherein during the transmission of a dominant signal pulse received from the first bus via the second bus the locking means are activated and vice versa.

12. The bus-repeater as set forth in claim 10, wherein unloading means are activated on transition from a dominant signal level to a recessive signal level.

13. The bus-repeater as set forth in claim 1, wherein the locking means comprise at least one first and one second OR gate for mutual latching, a first input of the first OR gate is connected with a receive output of the first transmit-receive means and a first input of the second OR gate is connected with a receive output of the second transmit-receive means and the output of the second OR gate is at least indirectly connected with a second input of the first OR gate and the output of the first OR gate is at least indirectly connected with a second input of the second OR gate.

14. The bus-repeater as set forth in claim 1, said bus-repeater is designed in the form of an integrated circuit package.

15. A bus connection plug including a bus-repeater as set forth in claim 1.

* * * * *